UNITED STATES PATENT OFFICE.

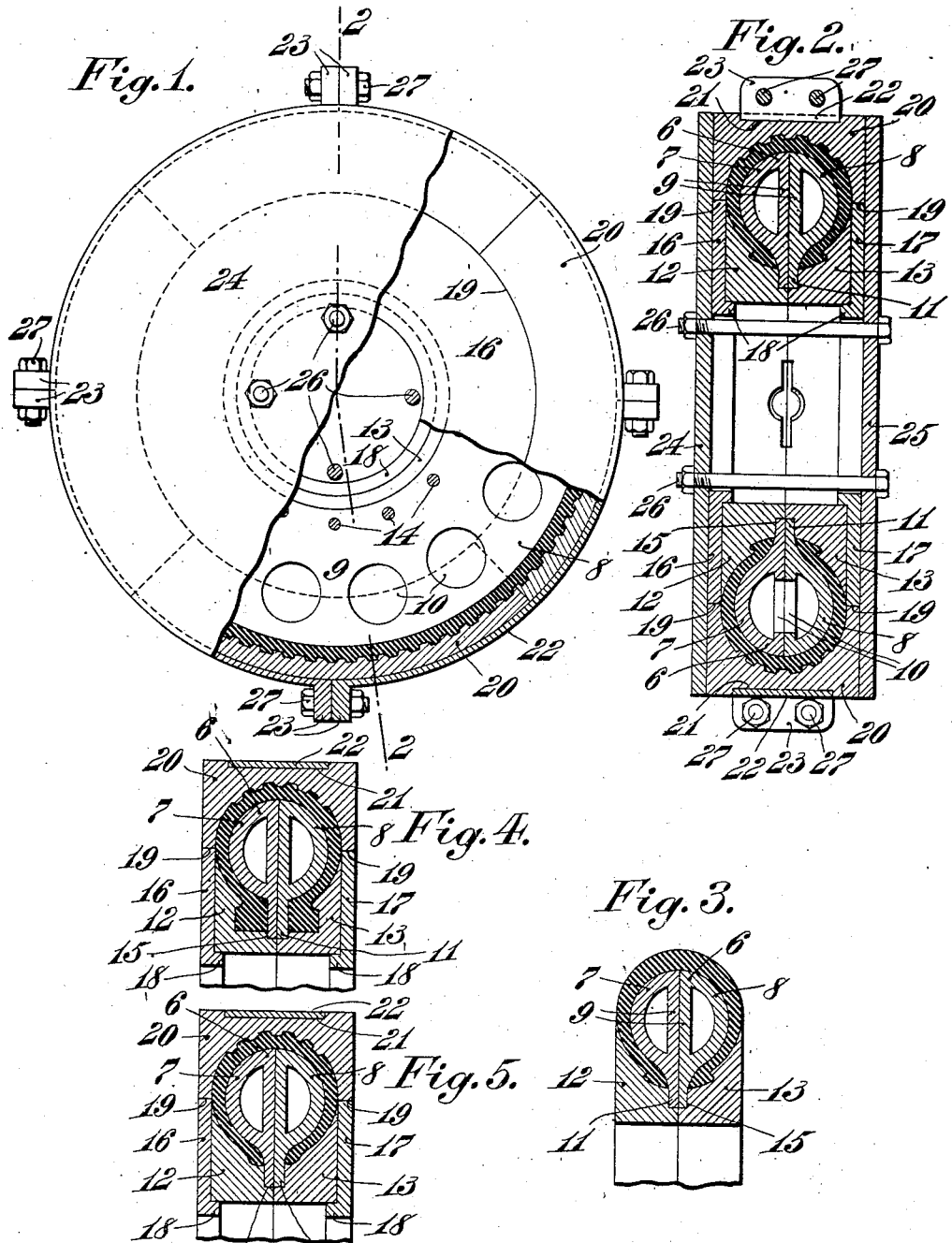

GEORGE JANVIER PAYNTER, OF PHILADELPHIA, PENNSYLVANIA.

TIRE-MOLD.

1,159,792.  Specification of Letters Patent.  Patented Nov. 9, 1915.

Application filed March 31, 1911. Serial No. 618,115.

*To all whom it may concern:*

Be it known that I, GEORGE JANVIER PAYNTER, a citizen of the United States, residing at Philadelphia, in the county of Philadelphia and State of Pennsylvania, have invented certain new and useful Improvements in Tire-Molds, of which the following is a specification.

My invention relates to tire molds and it relates more particularly to a tire mold which is adapted for use either in the full molded process of forming tires having a design tread or in the so called "open cure" process, it being understood that when it is desired to employ the mold for the "open cure" process certain of the parts are not used.

My invention contemplates considerable economy in the cost of a full set of molds for making the various sizes of tires required.

My invention also contemplates certain details of construction whereby the tires may be freely liberated from the mold after the curing operation.

The principal object of my invention is to provide a simple and efficient sectional mold for making and retreading tires which may be used in the full molded process for making tires having a design tread, and which is adapted as well for the so called "open cure" process of making tires having a plain or smooth tread, the parts being so constructed and arranged as to enable the tires having the design tread to be freely liberated from the mold after the curing operation.

The nature and characteristic features of my invention will be more readily understood from the following description taken in connection with the accompanying drawings forming part hereof, in which—

Figure 1 is a side elevation, partly broken away and partly in central section, of a tire mold embodying the main features of my present invention, and the tire being indicated in place therein; Fig. 2 is a transverse section thereof, taken approximately on the line 2—2 of Fig. 1; Fig. 3 is a fragmentary section of the mold and tire as arranged for the "open cure" process; and Figs. 4 and 5 are views similar to Fig. 3 but with the mold arranged for forming other well known types of molded tires.

Referring to the drawings, in the particular embodiments of my invention therein shown, 6 is the core of the mold, in shape complemental to the interior of the tire. The core 6 may if desired be made of a plurality of segments joined together in any preferred manner (not shown), this segmental construction being desired for convenience in removing the core from the finished tire. The segments of which the core is made up are preferably formed of two sections, 7 and 8 each substantially semicircular in cross section, and joined together on a medial plane by means of rivets 14 or other suitable fastenings. The abutting faces of the two sections 7 and 8 are preferably braced by a wall 9, and each of these walls is provided with a series of apertures 10 for lightening the structure. The core 6 also has an inwardly projecting flange 11 to provide means for establishing the proper relationship of the core 6 to other portions of the mold whereby the true shape of the finished tire is assured.

The inner exterior surfaces of the tire are formed by two annular rings 12 and 13, joined together on the medial plane and recessed as at 15 to receive the inwardly projecting flange 11 of the core 6. The inner faces of the rings 12 and 13 are in shape complemental to the inner exterior surfaces of the tire to be formed, either of the common clencher type as shown in Fig. 2, or of the well known "Fisk" or "Dunlop" types as shown in Figs. 4 and 5 respectively. The outer faces of the rings 12 and 13 are preferably in planes tangent to the point of greatest width of the tire, and upon these outer faces there are mounted rings 16 and 17, each properly located on its respective ring 12 or 13 by means of an annular flange 18 extending into the central aperture of the ring, or any other means of positioning the rings 16 and 17 on the mold rings 12 and 13 may be employed if desired. Each of the rings 16 and 17 is provided with a circumferential bearing edge or shoulder 19 for seating the outer or tread portion of the mold.

The outer or tread portion 20 of the mold is formed of a plurality of segments, preferably four in number, although it is possible to use a less number for some designs of tread. The segments constituting the tread portion 20 have their inner surfaces complemental to the design of the tread and are joined together in any suitable manner, but as shown, for this purpose the outer circumference may be grooved as at 21 and in the channel thus formed an encircling band 22 may be mounted. The band 22 may also be made in segments each provided at its respective ends with lugs 23 through which fastening bolts 27 may be passed. As before stated the segments constituting the tread portion of the mold are seated upon the circumferential edge or bearing shoulder 19 of the rings 16 and 17, and to prevent sidewise displacement of the tread portion there are provided side plates 24 and 25 which may be secured by means of bolts 26 passing through the central opening of the mold. Of course it will be understood that where the mold is used in conjunction with a hydraulic press vulcanizer or similar apparatus the plates 24 and 25 may be omitted as in this instance the platens of the press will perform the functions of the plates 24 and 25.

In view of the foregoing description of the various component parts of the mold, the manner of use of the same will now be readily understood. The green tire is first built up and shaped approximately on the annular core 6, after which the annular rings 12 and 13 are placed in position on the sides of the tire, to form the clencher bead as in Fig. 2, or any of the other types of bead, such for example as shown in Figs. 4 and 5. When the mold is to be used in the full molded process the supplementary rings 16 and 17 are then mounted on the rings 12 and 13, but when the "open cure" process is to be employed in curing the tire these rings 16 and 17 are omitted and the assembled core, tire and side rings 12 and 13 are wrapped in any suitable manner with strips of canvas or other suitable material, not shown, as this operation is well known to those skilled in the art. The assembly for the open cure process prior to the wrapping is shown in Fig. 3 of the drawings. When the mold is to be used in the full molded process, the segments of the outer ring 20, having their inner surfaces complemental to the design of the tread, are mounted around the tires and then brought and held in place by means of the encircling band 22, the edges of the segments abutting against and seated on the shoulders 19 formed by the side rings 16 and 17. Where the mold is to be placed in the chamber of an ordinary vulcanizer, the plates 24 and 25 are employed to prevent sidewise displacement of the parts.

It will thus be seen that there is provided a mold that may be used either for the full molded process or by the omission of certain of the parts for the open cure process. It will also be seen that the segmental tread portion of the mold may be alternatively used for making tires having various forms of fastening beads, thereby permitting numerous combinations for supplying the various kinds of tires demanded without requiring a complete individual mold for every form.

Having thus described the nature and characteristic features of my invention, what I claim as new and desire to secure by Letters Patent is:—

1. In a mold for tires, a pair of rings for forming the inner exterior surfaces of the tire, said rings having exterior surfaces tangent to the tire at its greatest width, a core supported by said rings, supplementary rings mounted on the inner mold rings, and a radially separable outer ring having a design therein for forming the tread of the tire mounted upon said supplementary ring and embracing that portion of the surface of the tire not embraced by the inner mold rings.

2. In a mold for tires, a pair of rings for forming the inner exterior surfaces of the tire, said rings having exterior surfaces tangent to the tire at its greatest width, a core supported by said rings, supplementary rings mounted on the inner mold rings, and a segmental outer ring having a design therein for forming the tread of the tire and embracing that portion of the surface of the tire not embraced by the inner mold rings, and the supplementary rings each having a circumferential bearing surface forming a seat for positioning the segmental tread ring with respect to the inner mold rings.

3. In a mold for tires, a pair of rings for forming the inner exterior surfaces of the tire, said rings having exterior surfaces tangent to the tire at its greatest width, a core supported by said rings, supplementary rings mounted on the inner mold rings, a segmental outer ring having a design therein for forming the tread of the tire, and embracing that portion of the surface of the tire not embraced by said inner mold rings, the supplementary rings each having a circumferential bearing surface forming a seat for positioning the segmental tread ring with respect to the inner mold rings, and means for preventing sidewise displacement of the segmental tread ring.

4. In a mold for tires, a pair of rings for forming the inner exterior surfaces of the tire, said rings having exterior surfaces tangent to the tire at its greatest width, a core supported by said rings, supplementary rings mounted on the inner mold rings, a segmental outer ring having a design therein for forming the tread of the tire, the supplementary rings having a circumferential bearing surface forming a seat for positioning the segmental tread ring with respect to the side rings, and means for preventing sidewise displacement of the segmental tread ring comprising plates on each side of the mold and fastenings coacting therewith.

5. In a mold for tires, a pair of rings for forming the inner exterior surfaces of the tire, a core supported thereby, removable means coacting with and auxiliary to said rings for forming a shoulder or support at the greatest width of the tire, and a segmental tread ring for forming the tread of the tire seated on said shoulder and embracing that portion of the surface of the tire not embraced by the inner mold rings.

6. In a mold for tires, a pair of rings for forming the inner exterior surfaces of the tire, a core supported thereby, removable means coacting with and auxiliary to said rings for forming a shoulder or support at the greatest width of the tire, a segmental tread ring for forming the tread of the tire seated on said shoulder and embracing that portion of the surface of the tire not embraced by the inner mold rings, and means independent of said inner mold rings for securing said segmental tread in position.

7. In a mold for tires, a pair of rings for forming the inner exterior surfaces of the tire, a core supported thereby, removable means coacting with and auxiliary to said rings for forming a shoulder or support at the greatest width of the tire, a segmental tread ring for forming the tread of the tire seated on said shoulder and embracing that portion of the surface of the tire not embraced by the inner mold rings, and means for securing said segmental tread ring in position including a circumferential clamping band directly mounted on the periphery of said tread ring.

In testimony whereof I affixed my signature in presence of two witnesses.

GEORGE JANVIER PAYNTER.

Witnesses:
 THEO. H. M'CALLA,
 MARY M'CALLA.